INVENTOR.
MACHIEL DE VRIES
BY
Irvin S. Thompson
ATTY.

Feb. 20, 1962 M. DE VRIES 3,022,384

PIEZO-ELECTRIC PICK UP

Filed Aug. 21, 1957 2 Sheets-Sheet 2

INVENTOR.
MACHIEL DE VRIES
BY

United States Patent Office 3,022,384
Patented Feb. 20, 1962

3,022,384

PIEZO-ELECTRIC PICK UP

Machiel de Vries, De Kempenaerstraat 51, Amsterdam, Netherlands

Filed Aug. 21, 1957, Ser. No. 679,438
Claims priority, application Netherlands Aug. 24, 1956
6 Claims. (Cl. 179—100.41)

This invention relates to a piezo-electric pick up substantially comprising a casing, a crystal element supported in said casing, a coupling element at least mainly consisting of flexible material and bearing against the crystal element and a stylus holder which with or adjacent its one end carrying a stylus bears against the coupling element while its other end is supported by the casing, the stylus carrying portion and the supported portion of the stylus holder being parallel to each other and to the longitudinal axis of symmetry of the crystal element, and the supported portion of the stylus holder being so supported as to be resilient and rotatable about its longitudinal axis.

It has been found that with pick ups of the above type reproduction distortions may occur which are a result of the fact that the stylus holder with the stylus on the one hand and the flexible coupling element on the other hand do not accurately vibrate in the same manner during the tracking of a groove by the stylus. This is due to the fact that the relative elements have entirely different forms and are besides made from entirely different materials. In connection therewith the possibility of securing the stylus directly in the flexible coupling element has been considered, so as to make certain that the coupling element follows the vibrations of the stylus. As a result of the very fact that a flexible coupling element is used, this solution cannot be applied, because the material directly surrounding the stylus is so resilient that the stylus may make movements which are not followed by the coupling element as a whole.

The object of the invention is so to improve pick ups of the above type that the aforementioned drawback is overcome. This may be achieved by means of a construction in which the stylus carrying end of the stylus holder is adapted to rotate about at least substantially the same axis about which the part of the coupling element adjacent the stylus holder vibrates.

To that end the pickup according to the invention is constructed so that the axis of the supported end of stylus holder intersects the coupling element at least substantially in the center about which that part of the coupling element bearing against the stylus carrying end of the stylus holder vibrates under the influence of movements of the stylus which are transversely directed in respect of the main direction of a groove.

The pick up according to the invention may further be so constructed that the axis of the supported stylus holder end intersects the coupling element substantially in the centre about which the part of the coupling element bearing against the stylus carrying end of the stylus holder oscillates under the influence of movements of the stylus which are transversely directed in respect of the main direction of a groove.

According to the invention the supported stylus holder end may further be surrounded by a tube of plastic material which tube is held by holding means directly or indirectly secured to the casing.

Furthermore according to the invention the supported stylus holder end may have a triangular or poly-angular outer circumference, the tube may have a circular cross-section and the holding means a triangular or poly-angular inner circumference.

In addition according to the invention the supported stylus holder end may be accommodated in a recess in an outer wall of the casing.

In conclusion according to the invention the holding means may be secured to the bottom of a removable clamping member located over the recess in the casing.

In illustration of the invention an embodiment will be described hereinafter with reference to the drawings.

Figures 1, 2:
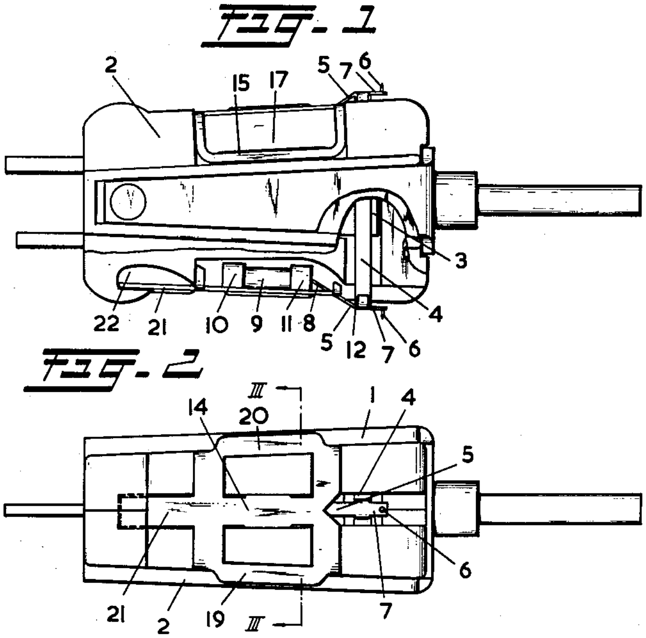
FIGURE 1 is a side view of the pick up, of which part of the side wall has been removed.
FIGURE 2 is a top view of the same pick up.
Figure 3:
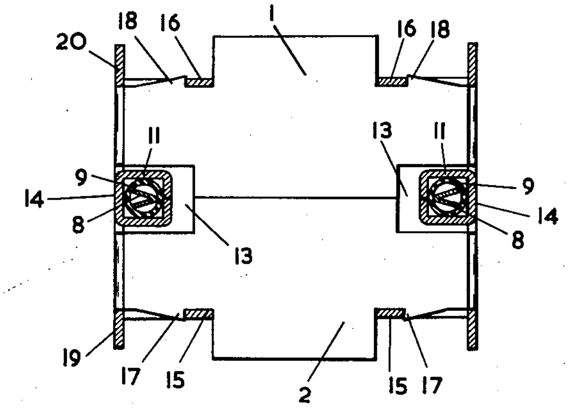
FIGURE 3 is a section on line III—III in FIGURE 2.
Figure 4:
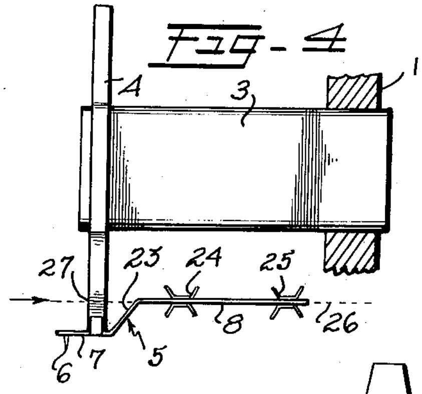
Figure 6:
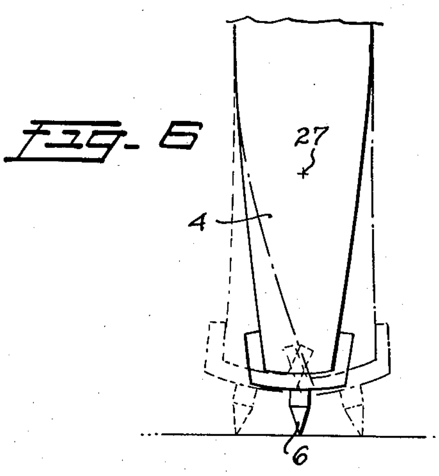
Figure 5:
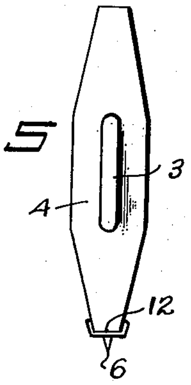
Figure 7:
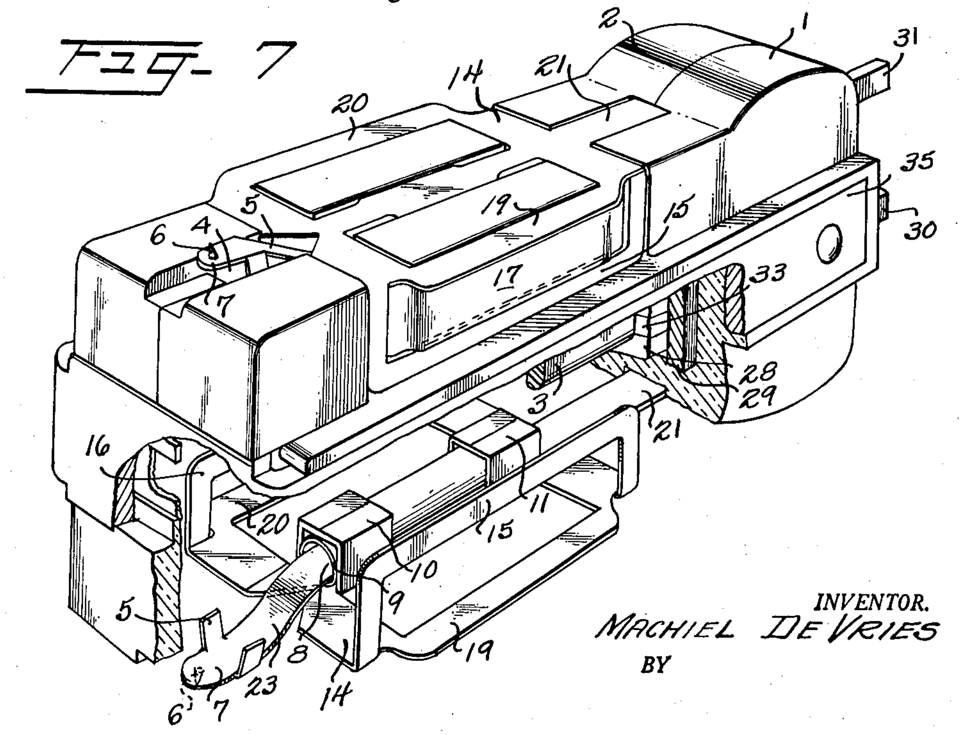

FIG. 4 diagrammatically shows a side-view of the pick-up;

FIG. 5 diagrammatically shows a front-elevation of the pickup, as seen looking in the direction of the arrow in FIG. 4;

FIG. 6 is a showing on an enlarged scale of the lowermost portion of FIG. 5 in various positions as a result of the vibrations of the stylus in a groove;

FIG. 7 is a perspective showing of the pickup according to FIGS. 1–3, on an enlarged scale, in which portions of the casing and other elements are omitted in order to clearly show the stylus holder and manner in which the stylus holder is supported.

The principle of operation according to the invention will be first described with reference to FIGS. 4–6. These figures are diagrammatic and clarify the principles of operation of the actual embodiment shown in FIGS. 1–3 and 7. The operation and structure of the embodiment of FIGS. 1–3 and 7 will then be described, after this diagrammatic description.

As shown in FIG. 4, the crystal element 3 has its one end (its right hand end as seen in FIG. 4) clamped in the casing designated by the reference numeral 1. On the other end (the left hand end as seen in FIG. 4) of the crystal element a coupling element 4 is secured. The coupling element 4 is of a resilient material and has a longitudinal gap 3 provided therein to receive the crystal element.

Against the lower end 12 of the coupling element 4, a horizontal portion 7 of a stylus holder which in its entirety is designated by 5, loosely bears. The portion 7 carries a stylus 6, and is connected by the oblique portion 23 to a second horizontal portion 8. The portions 7 and 8 are parallel to one another and to the longitudinal axis of symmetry of the crystal element 3.

Portion 8 of the stylus holder is mounted for rotation about its longitudinal axis in members 24 and 25. These members are diagrammatic representations of elements 9, 10 and 11, later to be described, and are fixed to the casing 1. Said mounting, it is true, is slightly resilient in all directions, but this does not alter the fact that when the stylus 6 performs movements at right angles to the plane of the drawing, such as the stylus will perform upon running through a track in a gramophone record, the stylus holder 5 in its entirety will perform an oscillatory movement about the longitudinal axis of the portion 8, which longitudinal axis is designated by the dotted line 26. When the stylus 6 oscillates in the manner mentioned the coupling element 4 will start oscillating in the same sense, owing to the friction between the portion 7 of the stylus holder 5 and the lower surface 12, as shown in FIG. 6, which shows a mid position and two deflected positions in dotted lines.

When the coupling element moves from its mid position it is bent in the manner as shown in FIG. 6. If now in each of the three positions shown a perpendicular on the lower surface 12 is drawn, said perpendiculars will intersect each other in the imaginary point 27. It is, therefore, as if the lower face 12 swings about the point 27. If the portion 7 of the stylus holder 5 is enabled also to swing about the imaginary point 27 the upper side of the portion 7 will always remain parallel to the lower surface 12 of the coupling element. This last is achieved by causing the axis 26 about which the stylus holder is adapted to oscillate, to pass through the point 27 as shown in FIG. 4. Because the stylus holder portion 7 follows the lower surface 12, said lower surface is not deformed by any means. If the stylus holder would oscillate in a horizontal position, the horizontal portion 7 would depress the slanting lower surface 12 down to the horizontal position, which deformation would entail a loss of energy.

It should be noted that the stylus 6 contacts the gramophone record in each of the three positions shown in FIG. 3—the coupling element 4 must be slightly shorter in a vertical sense in its mid position than in the positions in which it is laterally deflected. As a matter of fact this is the case, because in a vertical sense the coupling element is slightly compressed in its mid position.

A practical embodiment of the pickup according to these inventive concepts will now be described with reference to FIGS. 1–3 and 7 in which corresponding parts have been given the same reference numerals as those used in FIGS. 4–6. The embodiment is provided with two stylus holders as well as with two sets of means for supporting said stylus holders. Seeing that all these means form each others mirror image, reference shall only be made to a stylus holder with accessories in the specification for simplicity's sake.

Referring to FIG. 4, the casing again consists of two parts 1 and 2 and a crystal element 3 is provided. This crystal element is by means of a flexible coupling element 4 connected with a stylus holder 5 carrying a stylus 6. Said stylus holder 5 comprises a straight stylus carrying part 7 and a straight supported part 8. The stylus holder 5 substantially consists of a narrow strip, the part 8 of which is bent so as to have a V-shaped section. Said part 8 is surrounded by a circular tube 9 made of soft elastic material. This tube 9 in turn is held by two holding means 10 and 11 having a square-shaped inner circumference. As a result of the fact that the part 8 of the stylus holder only contacts the tube 9 along three lines there is only a slight friction between the part 8 of the stylus holder and the tube 9. Yet said friction is so great that in the case of very slight vibrations of the stylus holder about the axis of the part 8 no displacement of said part 8 in respect of the tube 9 takes place. In that case, therefore, the tube 9 is elastically twisted so that the part 8 will always automatically recover its position of rest. When vibrations having a larger amplitude occur the part 8 of the stylus holder may displace in respect of the tube 9. This moving capacity of the part 8 is increased because the outer circumference of the tube 9 also only contacts the holding means 10 and 11 along a number (4) of lines.

As more particularly appears from FIGURE 1 the supported part 8 of the stylus holder is bent in respect of the stylus carrying part 7 in the direction towards the crystal element 3. The stylus 6 as shown in FIGURE 1 in tracking a groove will perfom an oscillatory movement the direction of which is substantially normal to the plane of the drawing. The same applies to the part 12 of the coupling element 4 which part bears against the stylus carrying part 7 of the stylus holder. This part 12 of the coupling element may at least substantially vibrate about a certain imaginary axis and said axis is in alignment with the supported part 8 of the stylus holder.

The holding means 10 and 11 and the parts 9 and 8 surrounded by these means are accommodated in a recess 13 of the casing. The means 10 and 11 form part of a clamping means 14 bearing against the casing and covering the recess 13. The clamping means 14 comprises two brackets 15 and 16 adapted to snap behind raised parts 17 and 18. The clamping means 14 is further provided with gripping edges 19 and 20. A projecting part 21 of the clamping means 14 is accommodated in a recess 22 of the casing. The projection 21 together with the brackets 15 and 16 has a directing function which renders it possible to provide the clamping means 14 very easily in the correct position on the casing, i.e. in such a manner that the appropriate place of the stylus carrying part 7 will accurately rest on the part 12 of the coupling element 4.

In the foregoing reference is only made to one stylus holder and its appurtenances, but as will appear from the drawings the invention is likewise applicable to a pick up having more stylus holders.

I claim:

1. A piezo-electric pick up comprising, in combination, a casing, an elongated crystal element supported at one end by said casing, a coupling element of flexible material extending at right angles to the longitudinal axis of the crystal element and supported by the other end of said crystal element, a stylus holder having a stylus carrying portion bearing against the coupling element, the other end of said holder being supported by said casing, said stylus carrying portion and the said other end of the stylus holder being parallel to but offset with respect to each other and to the longitudinal axis of symmetry of the crystal element, means to support said other end of the stylus holder by the casing to be resiliently rotatable about its longitudinal axis, and said longitudinal axis of said other end intersecting said coupling element at a point about which the section of said coupling element bearing against said stylus carrying portion of the stylus holder vibrates under the influence of movements of the stylus.

2. A piezo-electric pick up comprising, in combination, a casing, an elongated crystal element supported at one end by said casing, a coupling element of flexible material extending transversely with respect to the longitudinal axis of the crystal element and supported by the other end of said crystal element, a stylus holder having a stylus carrying portion bearing against the coupling element, the other end of said holder being supported by said casing, said stylus carrying portion and said other end connected by an oblique portion so that the longitudinal axes of said carrying portion and said other end are offset from one another, means to support said other end of the stylus holder by the casing to be resiliently rotatable about its longitudinal axis, and said longitudinal axis of said other end intersecting said coupling element at a point about which the section of said coupling element bearing against said stylus carrying portion of the stylus holder vibrates under the influence of movements of the stylus.

3. The invention as defined in claim 1, wherein said casing is provided with a longitudinally extending recess and said other end of the stylus holder is received therein.

4. The invention as defined in claim 1, wherein said casing is provided with a projecting portion and said means to support the stylus holder includes clamping means detachably engageable with said projecting portion.

5. The invention as defined in claim 1, wherein said other end of the stylus holder is surrounded by a tube of plastic material in gripping engagement therewith, and said means to support the stylus holder includes an element encircling said tube in gripping engagement therewith.

6. The invention as defined in claim 5, wherein said other end of the stylus holder has a poly-angular cross-sectional configuration, said tube has a circular cross-sectional configuration, and said encircling element has a poly-angular cross-sectional configuration.

References Cited in the file of this patent

UNITED STATES PATENTS

| | | |
|---|---|---|
| 2,567,105 | Dreisbach | Sept. 4, 1951 |
| 2,771,295 | Andres | Nov. 20, 1956 |
| 2,798,120 | Sabol | July 2, 1957 |
| 2,848,558 | Poulton | Aug. 19, 1958 |